US010107937B2

United States Patent
Kasevich et al.

(10) Patent No.: US 10,107,937 B2
(45) Date of Patent: Oct. 23, 2018

(54) GRADIOMETER CONFIGURATION INVARIANT TO LASER PHASE NOISE AND SENSOR ROTATIONS

(71) Applicant: AOSense, Inc., Sunnyvale, CA (US)

(72) Inventors: Mark A. Kasevich, Palo Alto, CA (US); Miroslav Y. Shverdin, Mountain View, CA (US); Adam T. Black, Mountain View, CA (US); Todd L. Gustavson, Sunnyvale, CA (US)

(73) Assignee: AOSense, Inc., Sunnyvale, CA (US)

( * ) Notice: Subject to any disclaimer, the term of this patent is extended or adjusted under 35 U.S.C. 154(b) by 151 days.

(21) Appl. No.: 14/975,174

(22) Filed: Dec. 18, 2015

(65) Prior Publication Data
US 2016/0178792 A1 Jun. 23, 2016

Related U.S. Application Data
(60) Provisional application No. 62/095,671, filed on Dec. 22, 2014.

(51) Int. Cl.
*G01V 7/00* (2006.01)
*G01V 7/14* (2006.01)

(52) U.S. Cl.
CPC . *G01V 7/14* (2013.01); *G01V 7/00* (2013.01)

(58) Field of Classification Search
CPC .................................. G01V 7/14; G01V 7/00
USPC ............................................ 73/382; 434/300
See application file for complete search history.

(56) References Cited

U.S. PATENT DOCUMENTS

| 2005/0027489 A1* | 2/2005 | Kasevich | G01V 7/06 702/189 |
| 2010/0147071 A1* | 6/2010 | Schwartz | G01V 7/00 73/382 R |
| 2013/0144503 A1* | 6/2013 | Nishijima | F02D 41/1466 701/102 |
| 2014/0190254 A1* | 7/2014 | Bouyer | G01V 7/14 73/382 G |
| 2014/0319329 A1* | 10/2014 | Bidel | G21K 1/006 250/251 |

FOREIGN PATENT DOCUMENTS

WO    WO2013144503    * 10/2013    ............. G01C 21/10

OTHER PUBLICATIONS

Snadden, M. J., et al. "Measurement of the Earth's gravity gradient with an atom interferometer-based gravity gradiometer." Physical Review Letters 81.5 (1998): 971.

* cited by examiner

*Primary Examiner* — Manish S Shah
*Assistant Examiner* — Nigel Plumb
(74) *Attorney, Agent, or Firm* — Van Pelt, Yi & James LLP

(57) ABSTRACT

A system for gravity measurement includes one or more atom sources, two or more laser beams, and a polarizing beamsplitter and a retro-reflection prism assembly. The one or more atom sources is to provide three ensembles of atoms. The two or more laser beams is to cool or interrogate the three ensembles of atoms. The polarizing beamsplitter and the retro-reflection prism assembly are in a racetrack configuration. The racetrack configuration routes the two or more laser beams in opposing directions around a loop topology, intersecting the three ensembles of atoms with appropriate polarizations chosen for cooling or interferometer interrogation. The three ensembles of atoms are positioned coaxially when interrogated.

24 Claims, 8 Drawing Sheets

US 10,107,937 B2

GRADIOMETER CONFIGURATION INVARIANT TO LASER PHASE NOISE AND SENSOR ROTATIONS

CROSS REFERENCE TO OTHER APPLICATIONS

This application claims priority to U.S. Provisional Patent Application No. 62/095,671 entitled GRADIOMETER CONFIGURATION INVARIANT TO LASER PHASE NOISE AND SENSOR ROTATIONS filed Dec. 22, 2014 which is incorporated herein by reference for all purposes.

This invention was made with Government support under DE-AC52-07NA27344 awarded by the United States Department of Energy. The Government has certain rights in the invention.

BACKGROUND OF THE INVENTION

Field-capable gravimeters and gradiometers are currently used to measure gravity and gravity gradients for numerous applications including surveys of underground mineral and natural resources, predictions of earthquakes, and global climate research such as monitoring Earth's icecaps and water tables. Primary use comes from oil and mining companies, the defense industry, large-scale government-funded projects such as the National Geodetic Survey (NGS), academic researchers focused on studies of fundamental Earth's properties, and government agencies such as the United States Geological Survey (USGS).

The current standard for a high performance "absolute" fieldable gravimeter with high accuracy and low drift is a sensor that is based on measuring the position of a mechanical mirror in free-fall. However, this fieldable instrument suffers from a combination of high cost, high power consumption, frequent recalibration, lack of robustness, and long survey times. For example, the falling mirror wears out after repeated use and requires periodic replacement, limiting sensor utility for long-term monitoring. A second competing technology is a superconducting gravimeter. However, this "relative" instrument compares gravity values at different locations and is susceptible to measurement drift. Further the superconducting sensors require cryogenic cooling, limiting their fieldability; cryogenic cooling consumes kilowatts of power and adds substantial size and weight to the sensor.

BRIEF DESCRIPTION OF THE DRAWINGS

Various embodiments of the invention are disclosed in the following detailed description and the accompanying drawings.

DETAILED DESCRIPTION

Figure 2:
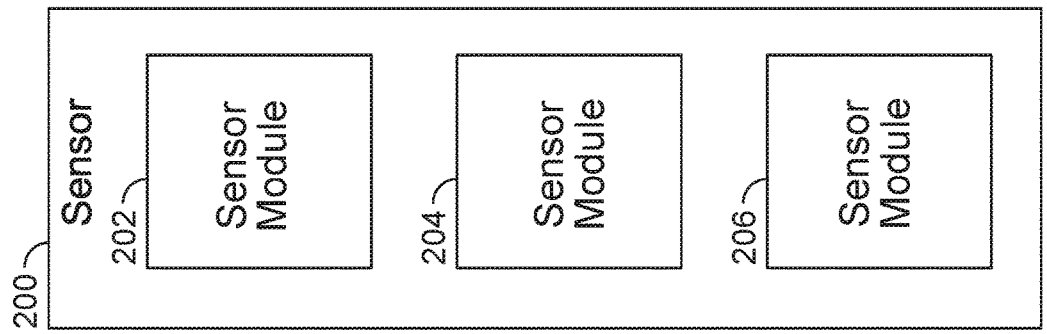
FIG. 2 is a diagram illustrating an embodiment of a gravity sensor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for gravity measurement is disclosed. The system comprises one or more atom sources to provide three ensembles of atoms. The system comprises two or more laser beams to cool or interrogate the three ensembles of atoms. The system comprises a polarizing beamsplitter and a retro-reflection prism assembly in a racetrack configuration to route the two or more laser beams in opposing directions around a loop topology intersecting the three ensembles of atoms with appropriate polarizations chosen for cooling or interferometer interrogation, wherein the three ensembles of atoms are positioned coaxially when interrogated.

In some embodiments, the cold-atom technology behind the disclosed gravity measurement system resolves and improves on the shortcomings of the current technology. Atoms are ideal test masses that fall in vacuum and do not couple to the external environment. Laser beams used to measure the position of the cold-atom cloud act as extremely precise rulers, accurate to a fraction of the wavelength of light. The disclosed sensor offers significant performance improvement over current state-of-the-art (SOA) fieldable gravimeters at reduced cost, size, and power consumption.

In some embodiments, the disclosed system comprises a high performance, highly compact, low power cold-atom gravity (CAG) sensor to measure minute variations in local gravity. This device is based on novel cold-atom technology that has demonstrated superior performance over SOA sensors. Cold-atom sensor technology is robust and fieldable in noisy locations without expensive site preparation or active isolation systems. The CAG sensor comprises a sensor head, the laser system, and the control electronics. The highly compact sensor head includes a small vacuum cell, beam routing optics, and a vacuum pump. It has no moving parts, providing long term stability while minimizing power consumption. Laser cooled atoms serve as identical test-masses. Atom clouds are continuously regenerated, avoiding the wear and tear issues of competing technologies. The laser system, which is based on low-power semiconductor technology, generates appropriate beams to manipulate the atoms inside the vacuum cell. The laser beams serve as a very accurate ruler that measures the falling atom cloud's position. The compact electronics control the laser system and record and digitize the gravity measurements. The three main subsystems are attached to a common field-deployable platform for simplified operation. Exceptional CAG sensor precision and intrinsic absolute calibration reduces field survey times. The CAG sensor also delivers excellent long-term stability, necessary for applications such as monitoring of underground movement of oil or gas, polar ice sheet melting, or seismic activity.

In some embodiments, the CAG Sensor has no moving parts, reducing its sensitivity to thermal variation and ground noise. With no moving parts to wear out, the sensor can operate continuously for long-term monitoring missions. The disclosed sensor leverages existing technologies to reduce the sensor volume and power consumption. A novel configuration of the sensor substantially suppresses well-known instrument sensitivity to high frequency vibration noise, enabling low cost field deployment. The sensor also incorporates a simplified optical layout to reduce sensor complexity and cost.

In some embodiments, a light pulse atom (LPA) sensor is an atom analog of an optical Mach-Zehnder interferometer. Lasers cool a cloud of atoms, slowing them from a few hundred m/s to a few cm/s without requiring any cryogens. The atoms are launched in vacuum with no coupling to the external environment. A series of interferometer pulses then act as beam splitters ($\pi/2$ pulses) and a mirror (it pulse), splitting and recombining the atomic wavepacket. In some embodiments, optical two-photon Raman transitions are used as the interferometer pulses, enabling unique capabilities for precision sensing. For example, electro-optic devices can dynamically shift the optical phase fronts to attain high dynamic range, high sensitivities, and eliminate certain systematic effects. After each interaction with the light pulses, the photon-to atom momentum transfer induces a phase shift $\phi_i = k_i \cdot x_i$, where $x_i$ is the atom position, and k is the effective wave vector of the transition. The inertial measurement sensitivity comes from the dependence of atomic trajectories on the local acceleration. The net phase difference between two interferometer arms is $\Delta\phi = k \cdot \alpha T^2$, where T is the time between interferometer pulses and $\alpha$ could be gravitational acceleration. The laser thus acts as a high precision ruler that measures the atom's location to a fraction of a wavelength of light. In some embodiments, a 780 nm laser frequency stabilized to <1 kHz, can measure the atom's position to ~$1:10^{12}$. Following the interferometer sequence, resonant fluorescence detection measures the excitation probability, $P_e$, of an atom from a ground to excited state, where $P_e = [1-\cos(\Delta\phi+\phi)]/2$, where $\Delta\phi = \phi_1 - 2\phi_2 + \phi_3$ for the simplest case of a 3-pulse sequence, and $\varphi$ is an arbitrary phase.

In some embodiments, the phase of one or more interferometer laser pulses is uniformly adjusted to control the phase of the atoms exiting the interferometer, for example, to servo the interferometer phase to a particular value. In some embodiments, the phase of one or more interferometer laser pulses is spatially modulated to create a spatial phase variation across the ensembles of atoms and facilitates quadrature detection and or tracking of the interferometer phase in the presence of platform vibration induced acceleration noise. In some embodiments, detection is done with a camera for spatial resolution. In some embodiments, detection is done using a photodiode.

In some embodiments, an atomic gravity gradiometer includes two or more gravimeters common-mode coupled to substantially reduce sensitivity to various noise sources and systematic drifts, such as vibrations or laser intensity fluctuations that would otherwise decrease measurement sensitivity and increase the noise floor. For example, two or more atomic fountains may share the same interferometer pulses. The inhomogeneous gravity field induces slightly different phase shifts, $\Delta\phi_{UPPER}$ and $\Delta\phi_{LOWER}$ between the upper and lower clouds separated by L. The differential gradiometer signal is $\Gamma = (\Delta\phi_{UPPER} - \Delta\phi_{LOWER})/(|k|T^2 L)$. The Earth's contribution to this signal (~3,080 E) is static and can be subtracted by calibrating the apparatus prior to a measurement. In some embodiments, the distance from the target mass to the gradiometer is comparable to the atom cloud separation. Note that $\Gamma$ equals the gravity gradient (the second derivative of the scalar potential) only in the limit where the atom cloud separation is much smaller than the distance to the mass.

In some embodiments, the gradiometer performance is ultimately limited by the signal to noise ratio (SNR). The acceleration sensitivity is $\Delta\alpha = ((SNR)k_{eff}T^2\sqrt{R})^{-1}$, where R is total atom cloud launch rate. T is limited by the thermal spread of the atomic cloud, and is typically less than a few hundred milliseconds.

In some embodiments, the gradiometer includes the following: (1) The sensor operates in the large momentum transfer Bragg regime, which improves the gradiometer sensitivity by more than an order of magnitude; and (2) an advanced atom cooling trap reduces the initial atom temperature to a few hundred nanokelvin, more than an order of magnitude better than existing 3D magneto-optical traps with polarization gradient cooling.

In some embodiments, in the Bragg scattering regime, there is no change in the internal energy state of the atom. Atoms scatter off the standing wave created by two counter-propagating light fields with the same polarization. The scattering satisfies the Bragg condition: $\lambda_L \sin(\theta_n) = N\lambda_{dB}$. Here, $\lambda_L$ is the standing wave's wavelength, $\theta_n$ is the scatter angle for $N^{th}$ order scatter and $\lambda_{dB}$ is the de Broglie wavelength of the atom. In the atomic interferometer, the detuning is varied, $\omega_{12}$, between the two fields to select the desired higher order scattering (N). The detuning equals the atom recoil frequency, $\omega_{12} = N^2\hbar k^2/(2m)$, where m is the atomic mass. For the N=40 scattering order in rubidium, $\omega_{12} = 2\pi \times 6$ MHz. In the gradiometer configuration, the atoms launch collinearly with the light fields. The momentum transfer is along the light wave vector and $\theta_n = 0$.

In some embodiments, the main obstacle to attaining high-order momentum transfer is the nonzero momentum spread of the atoms. As the momentum transfer order increases, the π/2–π–π/2 pulse sequence transfers more of the atoms to other nearby momentum states. This degrades and eventually destroys interferometer contrast. In some embodiments, operation is in the sequential Bragg regime, sequentially applying several π/2 and π pulses. Each pulse imparts only a few ℏk of momentum to the atoms, ensuring a cleaner overall population transfer from the ground to the excited momentum states.

In some embodiments, for large momentum transfer Bragg interferometers using rubidium atoms, the atomic cloud should be cooled to 100s of nanokelvin to reduce its momentum width. These temperatures, below the recoil limit, are readily achieved via three-dimensional delta-kick cooling. The atoms are allowed to expand in the spherically harmonic potential and then switch off the magnetic field after an appropriate time, $t_{on}$. The cooling process is then less sensitive to potential anharmonicity and the precise timing of the magnetic field turn-off. In some embodiments, the atoms cool to approximately 100 nK scale temperatures in 50 ms, which does not significantly extend the measurement cycle time. The number of atoms in the interferometer sequence remain effectively the same as without the delta-kick cooling stage. Compared to other cooling techniques, such as evaporative cooling, delta-kick cooling is faster and requires lower driving currents. In some embodiments, the delta-kick cooling is implemented using a specially configured time-orbiting potential (TOP) trap.

In some embodiments, resonant fluorescence detection measures the excitation probability $P_e$ that an atom ends up in a particular ground state after the interferometer sequence: $P_e = [1 - \cos(\Delta\Phi + \phi_L)]/2$. $\Delta\Phi = \phi_1 - 2\phi_2 + \phi_3$ is the net phase difference between two paths of the interferometer, and $\phi_L$ is the laser arbitrary phase. $\phi_i = \vec{k}_i \cdot \vec{x}_i$ is the phase shift the atoms acquire from Raman pulse i when the atoms are at position $\vec{x}_i$, and $\vec{k}_i$ is the effective wave vector corresponding to the two-photon Raman transition for pulse i. Evaluation of this expression for uniform accelerations or rotations leads to the inertial measurement sensitivity $\Delta\Phi = \vec{k} \cdot \vec{g} T^2$, where $\vec{k}$ is the average Raman wave vector, $\vec{g}$ is the local gravity, and T is the interferometer interrogation time. Hence, gravity can be expressed as:

$$g = \frac{\Delta\Phi}{|\vec{k}|T^2}$$

In some embodiments, when a sensor comprises two or more interferometers, the measured phase for each interferometer n is $\Delta\Phi_n$. The gravity gradient $$\Gamma = \frac{\Delta g}{L}$$

between any two interferometers, u and l linearly separated by distance L is then:

$$\Gamma_{ul} = \frac{\Delta\Phi_u - \Delta\Phi_l}{|\vec{k}|T^2 L}.$$

Derivative of the gravity gradient between three equally spaced interferometers upper, middle, and lower: u, m, l, where distance from u and m is L, and the distance from m and l is L, and the distance between u and l is 2L is then $$\Gamma' = \frac{\Gamma_{um} - \Gamma_{ml}}{L}.$$

In terms of interferometer phase, the derivative of the gravity gradient is then:

$$\Gamma' = \frac{\Delta\Phi_u - 2\Delta\Phi_m + \Delta\Phi_l}{|\vec{k}|T^2 L^2}.$$

In some embodiments, a gradiometer comprising three gravimeters all sharing a common pair of Raman beams has strong noise suppression properties compared to the traditional two-gravimeter design. In fact, the two main obstacles to fielding a two-gravimeter gradiometer is its susceptibility to laser phase noise and to instrument rotations. Both of these obstacles are overcome in a three-gravimeter design. The noise suppression properties to both of these effects are explained below Invariance to Laser Phase Noise In some embodiments, the influence of laser phase noise can be written as $$\delta\Phi = \int_{-\infty}^{\infty} g(t) \frac{d\phi}{dt} dt = \int_{-\infty}^{\infty} dt\, g(t) \left( \frac{d\phi_A(t)}{dt} - \frac{d\phi_A(t - t_d)}{dt} \right),$$

where g(t) is the interferometer sensitivity function, $\phi_A(t)$ is the phase of the master Raman laser, and $t_d$ is the time delay between the two laser frequencies interacting with the atom cloud. The path difference between lasers A and B determines $t_d$.

In some embodiments, the frequency difference between the two lasers A, B is assumed to be perfectly stable. For three equally spaced gravimeters comprising a single gradiometer, it can be shown that the following quantity is approximately zero in appropriate limits and therefore is invariant to phase noise:

$$2\delta\Phi_{II} - \delta\Phi_I - \delta\Phi_{III} = 2\int_{-\infty}^{\infty} dt\, g(t)[\nu_1(t) - \nu_1(t - t_d + \Delta)] - \int_{-\infty}^{\infty} dt\, g(t)[\nu_1(t) - \nu_1(t - t_d)] - \int_{-\infty}^{\infty} dt\, g(t)[\nu_1(t) - \nu_1(t - t_d + 2\Delta)]$$

Where, $\Delta$ is the extra time delay at gravimeters II and III as compared to gravimeter I, and $\nu(t) = d\phi/dt$ is the laser frequency. Simplifying, gives the following:

$$2\delta\Phi_{II} - \delta\Phi_I - \delta\Phi_{III} = \int_{-\infty}^{\infty} dt\, g(t)\{[\nu_1(t - t_d + \Delta) - \nu_1(t - t_d)] - [\nu_1(t - t_d + 2\Delta) - \nu_1(t - t_d + \Delta)]\}$$

If it is assumed that $\Delta$ is small compared to $t - t_d$ or that $\nu(t)$ is sufficiently slowly varying on the time scale of $2\Delta$ (for a gradiometer with 1 m baseline separation, this implies that the frequency noise power spectral density rolls off at frequencies above 300 MHz), the first order Taylor expansion is then $v_1(t-t_d+\Delta)=v_1(t-t_d)+\Delta * v_1'(t-t_d)$, and $v_1(t-t_d+2\Delta)=v_1(t-t_d)+2\Delta * v_1'(t-t_d)$.
Then, $$2\delta\Phi_{II}-\delta\Phi_I-\delta\Phi_{III}=\int_{-\infty}^{\infty}dtg(t)[\Delta * v_1'(t-t_d)-\Delta * v_1'(t-t_d)]=0$$

Invariance to Instrument Rotations

In some embodiments, gradiometer signal sensitivity to platform rotations is examined by analyzing analytically and numerically the signal for a gravimeter, a gradiometer comprised of two vertically offset gravimeters, and a gradiometer comprised of three vertically offset gravimeters. The signal from the three instruments is examined in the presence of platform rotations due to (1) nearby mass and (2) earth's gravity field. The analytical error model for the three devices is derived by solving the equation of motion for an atom $\vec{r}(t)$ launched in the rotating frame of reference fixed on the Earth's surface:

$$\frac{d^2\vec{r}(t)}{dt^2} = \vec{g} - 2\vec{\Omega} \times \frac{d\vec{r}(t)}{dt} - \vec{\Omega} \times [\vec{\Omega} \times (\vec{r}(t)+\vec{R})] + 2T_{ij}r_j(t) \quad (1)$$

Here, $\vec{R}$ is the distance from the center of the earth to the location of atom launch, $\vec{\Omega}$ is the Earth's rotation, $\vec{g}$ is the constant gravity acceleration on Earth's surface, and $T_{ij}$ is the gravity gradient tensor. The coordinate system has x, y, z facing North-East-Down respectively, fixed on the Earth's surface. Equation (1) can be solved analytically if the gravity gradient term is treated as a perturbation. Ignoring the gravity gradient term, Eq. (1) is then solved with appropriate initial conditions, and the interferometer phase in the absence of gravity gradients is calculated as $$\phi_0 = \vec{k} \cdot [\vec{r}(t_0) - 2\vec{r}(t_0+T) + \vec{r}(t_0+2T)],$$

where T is the delay between successive interferometer pulses and $t_0$ is the time of the first Raman pulse. The contribution of the gravity gradient to the total interferometer phase is then:

$$\phi_{gg} = T_{zz}k_zT^2\left[\frac{7}{12}g_zT^2 - (v_z + 0.5v_{rec})T\right]$$

Here, $T_{zz}$ is the zz component of the gravity gradient, and $v_{rec}$ is the atom recoil velocity. The perturbative approach is accurate at the μrad phase level. The total interferometer phase is then $\phi_{Total}=\phi_0+\phi_{gg}$. For a three cell gravimeter, the signal is $\phi_{GRAD}=2\phi_M-\phi_U-\phi_L$, where $\phi_M$ is the middle gravimeter.

In some embodiments, an analysis of the contribution of platform rotations to the measurement phase noise of two cell and three cell gradiometers using both analytic and numerical approaches shows that the effects of rotations are small for both gradiometer configurations for reasonably small rotation angles during the measurement interval (e.g., 1 mrad). For higher magnitude rotational noise (e.g., 10 mrad), the phase error for a two cell gradiometer approaches 0.1 mrad, or 10% of a typical gradiometer noise floor. The rotational noise is completely suppressed for a 3 cell gradiometer in the earth's gravity field. In the presence of a nearby mass, the noise contribution of platform rotation is small for both three and two cell gradiometer configurations.

Figure 1:
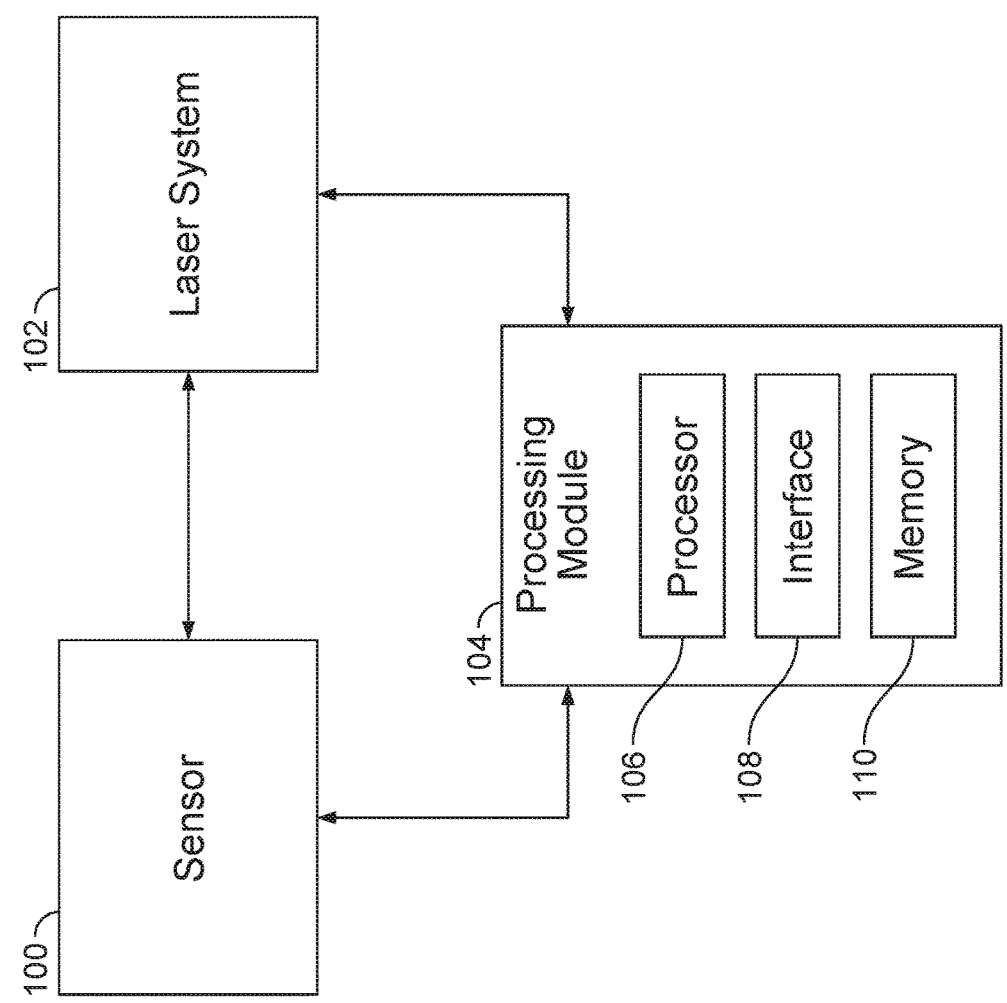
FIG. 1 is a diagram illustrating an embodiment of a system for gravity measurement.

FIG. 1 is a diagram illustrating an embodiment of a system for gravity measurement. In the example shown, the system for gravity measurement comprises sensor 100, laser system 102, and processing module 104. Processing module 104 comprises processor 106, interface 108 (e.g., for communicating with sensor 100 and/or laser system 102), and memory 110 (e.g., for storing data and/or instructions for processor 106). Processing module 104 provides indication(s) to sensor 100 to perform a measurement. In some embodiments, indication(s) provided include one or more of the following: an indication to provide atoms to 2-dimensional-magneto-optic traps (e.g., 2D-MOTs within sensor 100), an indication to provide atoms to 3-dimensional-magneto-optic traps (e.g., 3D-MOTs within sensor 100), an indication to provide laser beams (e.g., from laser system 102) to cool the atoms, an indication to provide laser beams (e.g., from laser system 102) to interrogate the atoms, an indication to detect a signal from the atoms (e.g., atoms within sensor 100), an indication to tune or set polarization of laser beams, an indication to process received signal from the atoms (e.g., atoms within sensor 100), an indication to determine gravity measurement(s) (e.g., a gravity measure, a gradient or derivative of gravity measure, etc.), or any other appropriate indication. Sensor 100 is a sensor for measuring gravity by sensing atoms falling and measuring the atoms using a laser beam. Laser system 102 provides one or more laser beams to sensor 100 for measuring the atoms and for cooling the atoms.

FIG. 2 is a diagram illustrating an embodiment of a gravity sensor. In some embodiments, sensor 200 is used to implement sensor 100 of FIG. 1. In the example shown, sensor 200 comprises multiple sensor modules (e.g., 2, 3, 4, 5, N, etc. sensor modules—for example, sensor module 202, sensor module 204, sensor module 206, etc.) whose combined measurements substantially reduce sensitivity to various noise sources and systematic drifts, such as vibrations or laser intensity fluctuations that would otherwise decrease measurement sensitivity and increase the noise floor. In some embodiments, sensor modules are placed along a line. In various embodiments, sensor modules are spaced equally along a line, are space unequally in a line, or any other appropriate arrangement.

Figure 3:
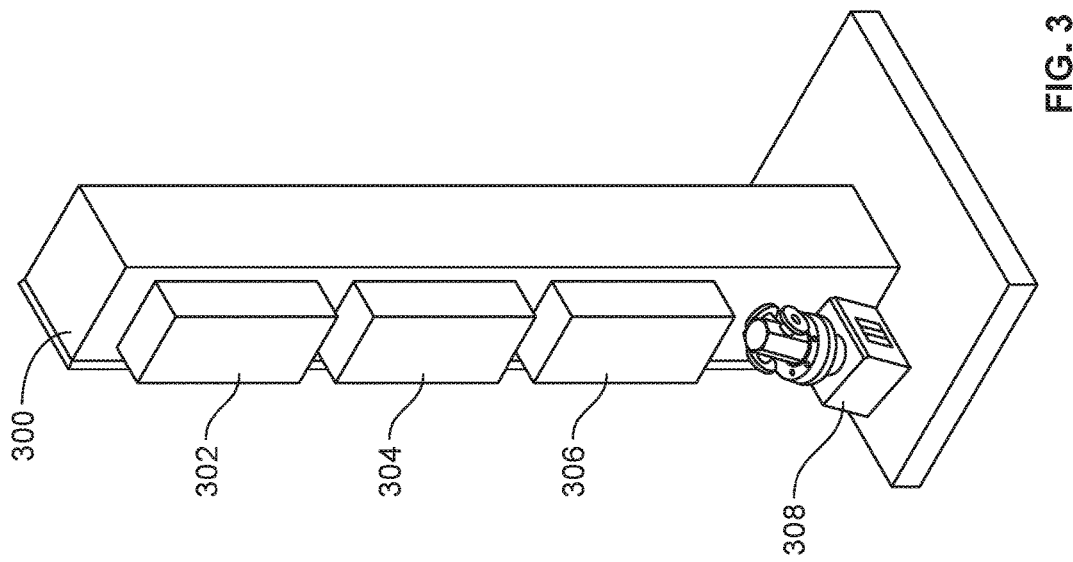
FIG. 3 is a diagram illustrating an embodiment of a gravity sensor.

FIG. 3 is a diagram illustrating an embodiment of a gravity sensor. In some embodiments, sensor 300 is used to implement sensor 200 of FIG. 2. In the example shown, sensor 300 comprises three sensor modules (e.g., sensor module 302, sensor module 304, sensor module 306) whose combined measurements substantially reduce sensitivity to various noise sources and systematic drifts, such as vibrations, laser phase fluctuations, or laser intensity fluctuations that would otherwise decrease measurement sensitivity and increase the noise floor. In some embodiments, sensor modules are placed along a line. In various embodiments, sensor modules are spaced equally along a line, are space unequally in a line, or any other appropriate arrangement. Sensor 300 sits on a mounting base and includes an interior space that allows cooled atoms to fall. In some embodiments, one or more laser beams are input to sensor 300 and distributed for cooling or sensing as appropriate. Sensor 300 includes ion pump 308 to evacuate an interior tube to encompass falling atoms that are ultimately measured using laser beams. In various embodiments, other vacuum pumps are used in place of or in addition to the ion pump, such as non-evaporable getter pumps, titanium sublimation pumps, turbo-molecular pumps, or any other appropriate vacuum pump.

Figure 4:
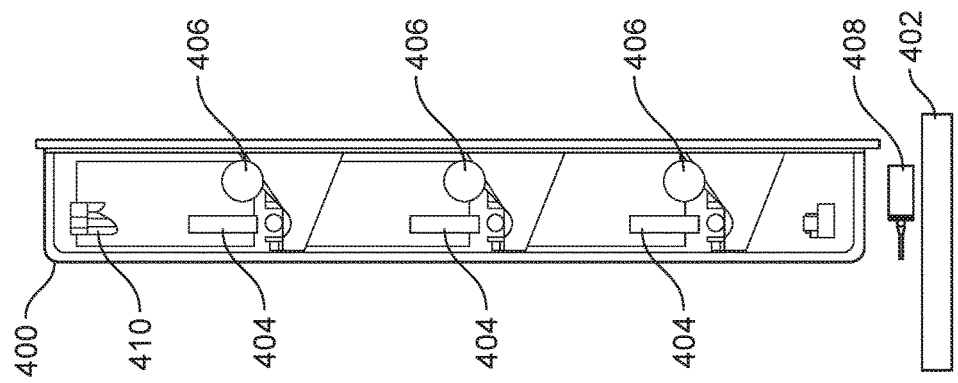
FIG. 4 is a diagram illustrating an embodiment of a gravity sensor.

FIG. 4 is a diagram illustrating an embodiment of a gravity sensor. In some embodiments, sensor 400 is used to implement sensor 200 of FIG. 2. In the example shown, sensor 400 comprises three sensor modules whose combined measurements substantially reduce sensitivity to various noise sources and systematic drifts, such as vibrations, laser phase fluctuations, or laser intensity fluctuations that would otherwise decrease measurement sensitivity and increase the noise floor. In some embodiments, sensor modules are placed along a line. In various embodiments, sensor modules are spaced equally along a line, are spaced unequally in a line, or any other appropriate arrangement. Sensor 400 sits on a mounting base 402 and includes an interior space where cooled atoms fall (e.g., atomic fountain volume 404). Atom sources 406 provide atoms for sensor 400. In various embodiments, atom sources 406 comprise 2D-MOTs, 3D-MOTs, or any other source or cooling components. Atom sources 406 provide ensembles of atoms that are dropped or launched into the measurement space. In some embodiments, the atom ensembles are launched vertically upwards to extend the measurement time window. Atom ensembles are interrogated using one or more laser beams distributed from one or more laser sources using one or more sets of laser distribution optics 408. In some embodiments, one or more laser beams are input to sensor 400 and distributed for cooling or sensing as appropriate. The laser beams propagate from laser distribution 408 along a racetrack that includes retroreflecting mirror assembly 410 and a polarizing beamsplitter.

Figure 5:
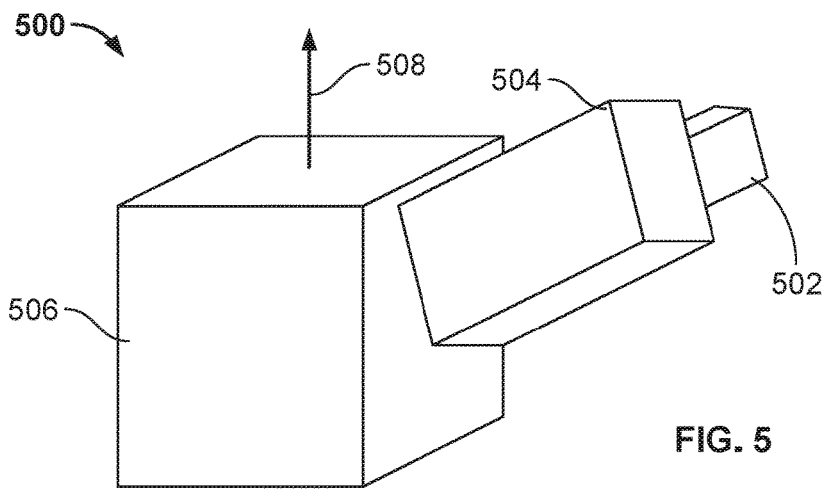
FIG. 5 is a diagram illustrating an atom source.

FIG. 5 is a diagram illustrating an atom source. In some embodiments, atom source 500 of FIG. 5 is used to implement each of atom sources 406 of FIG. 4. In the example shown, atom source 500 comprises atom dispenser 502, 2D-MOT 504, and 3D-MOT and TOP trap 506. Atom dispenser 502 provides atoms that are cooled successively by 2D-MOT 504 and 3D-MOT and TOP trap 506. In some embodiments, cooled ensembles of atoms in 3D-MOT and TOP trap 506 are launched vertically upward (e.g., along direction 508) for a measurement of gravity.

Figure 6A:
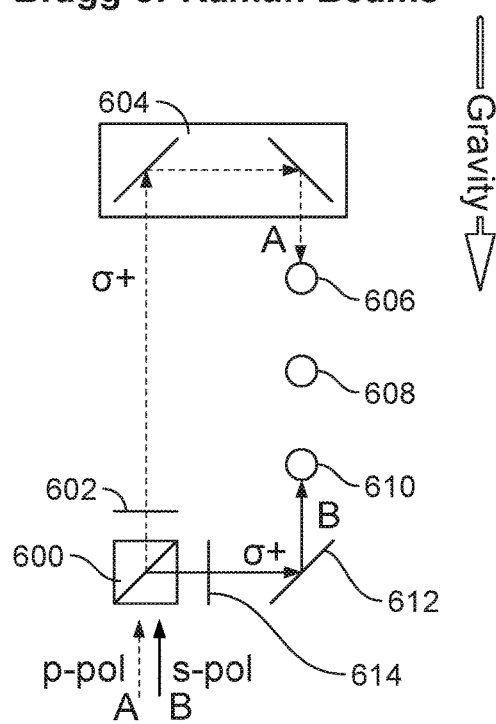
FIG. 6A is a diagram illustrating a racetrack geometry for a gravity sensor.

FIG. 6A is a diagram illustrating a racetrack geometry for a gravity sensor. In some embodiments, the gravity sensor of FIG. 6A is used to implement sensor 200 of FIG. 2. In the example shown, laser beam A with p-polarization and laser beam B with s-polarization are input to polarizing beamsplitter cube 600. Laser beam A passes through quarter wave plate 602 to produce a σ+ beam that reflects off retroreflector 604 to interrogate atom ensembles located at position 606, position 608, and position 610. Laser beam B reflects off beamsplitter cube 600, passes through quarter wave plate 614 to produce a σ+ beam that reflects off of mirror 612 to interrogate atom ensembles located at position 610, position 608, and position 606 (from the opposite direction compared to laser beam A). In some embodiments, two-photon Raman transitions are used to produce the atom interference. Raman transitions are between two internal energy levels of the atom, and the fluorescence of one or both states are detected after the interferometer (if both, it is called normalized detection, which has better immunity to fluctuations to the total number of atoms). In some embodiments, Bragg transitions between different atomic momentum states but the same internal state are used to produce atom interference. To detect the relative populations of different momentum states, the system waits until the different momentum states are no longer physically overlapped, then detects fluorescence of one or both clouds. In various embodiments, in either the Raman or Bragg case, detection is done with one or more photodiodes, multi-segment photodiodes, cameras, or any other appropriate detector.

Figure 6B:
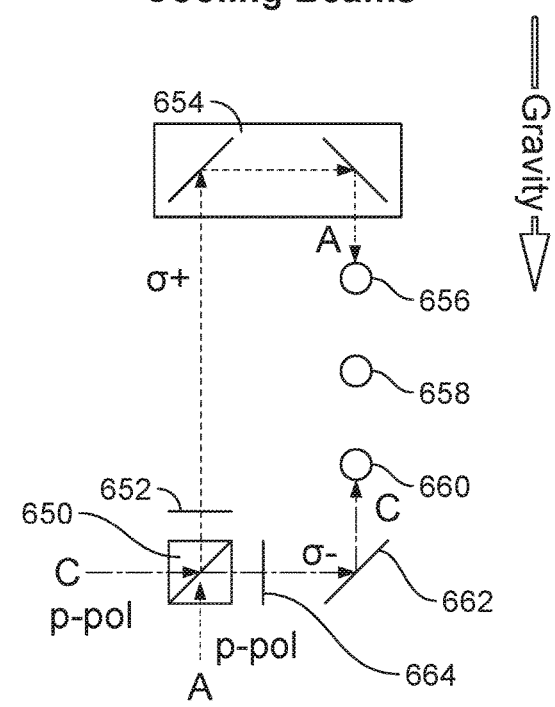
FIG. 6B is a diagram illustrating a racetrack geometry for a gravity sensor.

FIG. 6B is a diagram illustrating a racetrack geometry for a gravity sensor. In some embodiments, the gravity sensor of FIG. 6B is used to implement sensor 200 of FIG. 2. In the example shown, laser beam A with p-polarization and laser beam C with p-polarization are input to polarizing beamsplitter cube 650. Laser beam A passes through quarter wave plate 652 to produce a σ+ beam that reflects off retroreflector 654 to cool atom ensembles located at position 656, position 658, and position 660. Laser beam C passes through beamsplitter cube 650, passes through quarter wave plate 664 to produce a σ− beam that reflects off of mirror 662 to cool atom ensembles located at position 660, position 658, and position 656 (from the opposite direction compared to laser beam A).

Figure 6C:
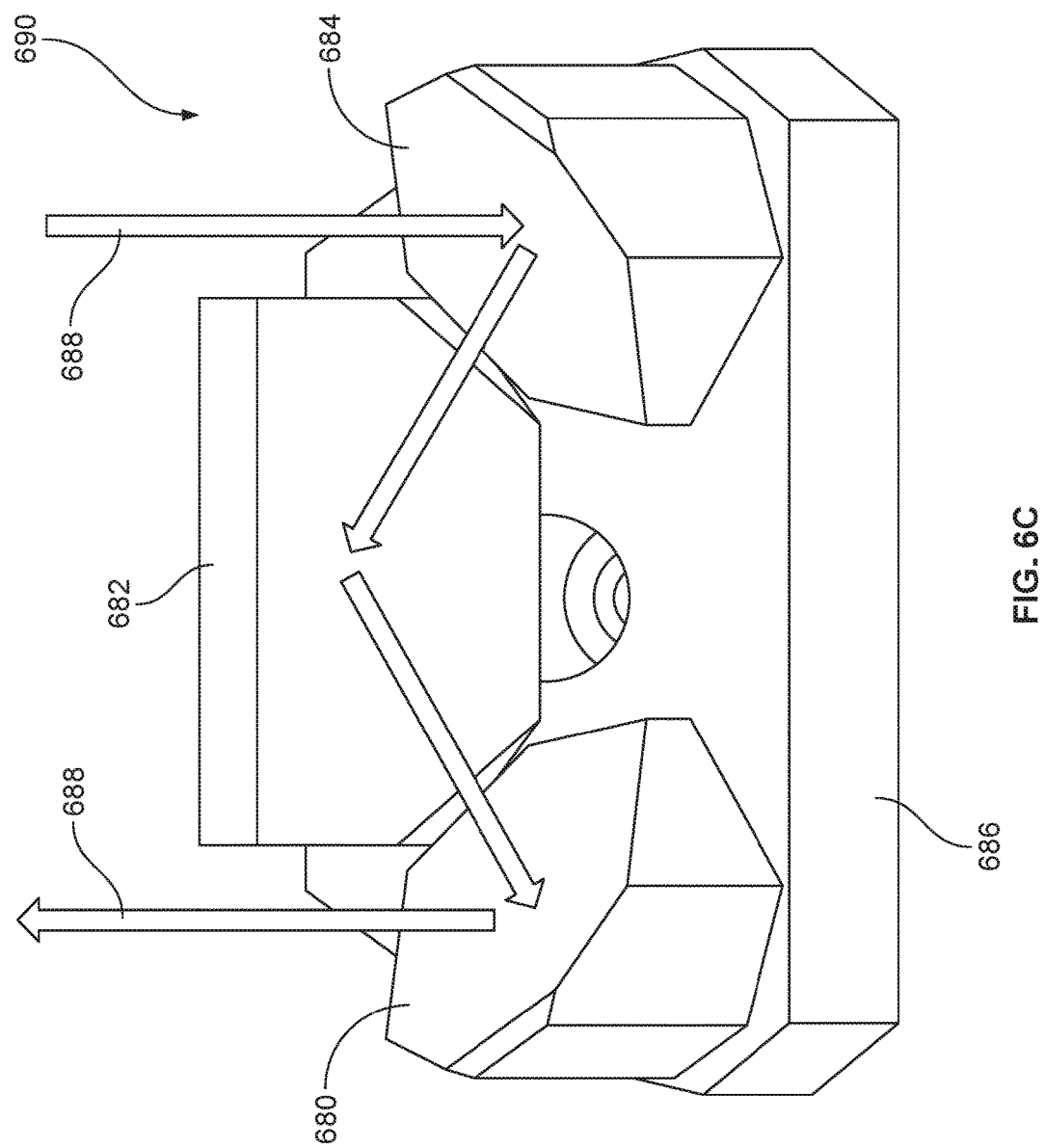
FIG. 6C is a diagram illustrating a retro-reflection assembly for a gravity sensor.

FIG. 6C is a diagram illustrating a retro-reflection assembly. In some embodiments, retro-reflection assembly 690 is used to implement retro-reflector 410 of FIG. 4, retro-reflector 604 of FIG. 6A, or retro-reflector 654 of FIG. 6B. In the example shown, retro-reflection assembly 690 comprises prism 680, prism 682, and prism 684 mounted to base plate 686. Prism 680 and prism 684 are mounted so that a beam is reflected with appropriate separation 688, and incident and reflected beams are guaranteed by geometry to be substantially parallel. In some embodiments, mirrors are used rather than prisms. In some embodiments, total internal reflection is utilized in a prism or bonded prism assembly.

Figure 7:
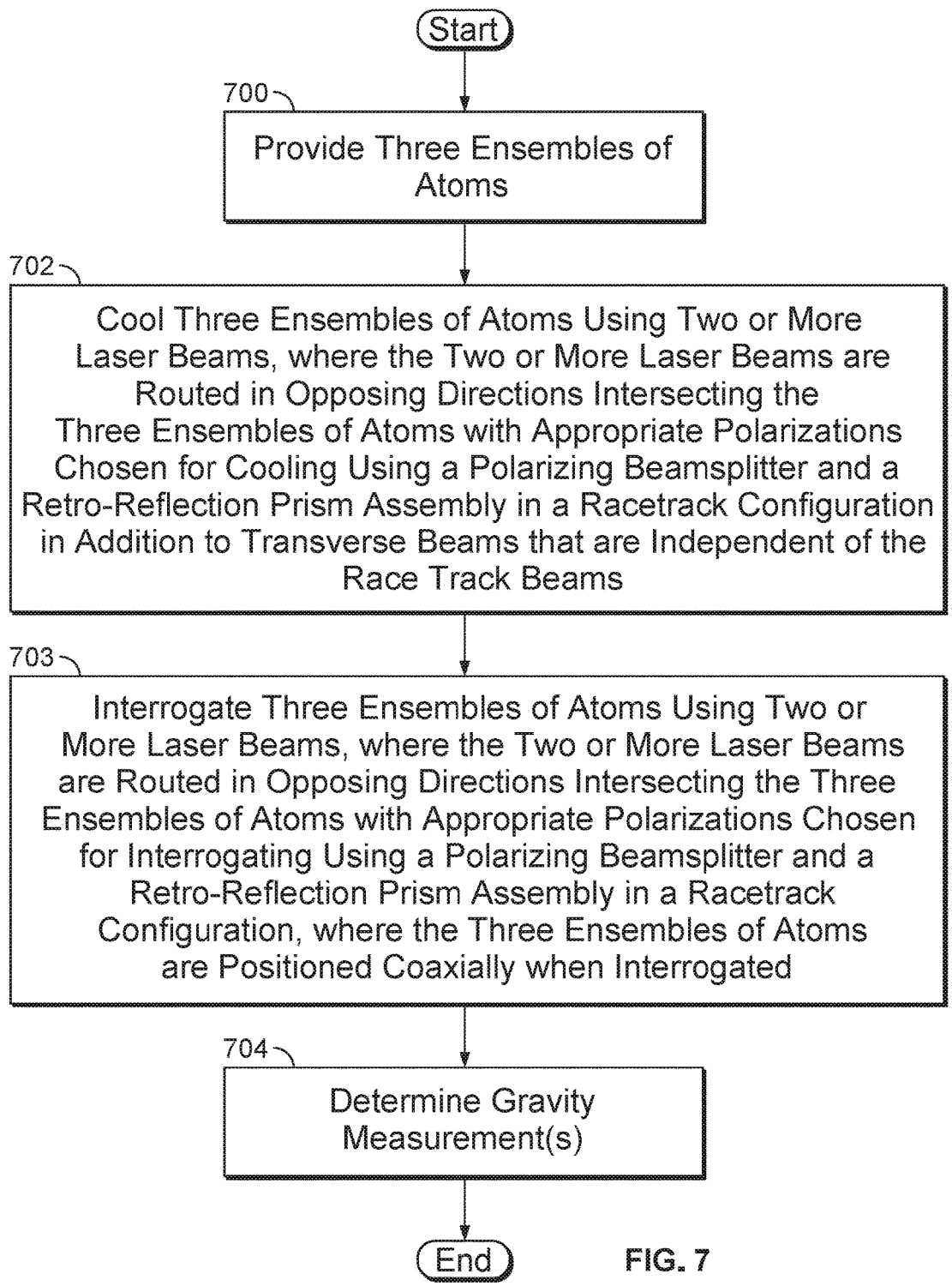
FIG. 7 is a flow diagram illustrating an embodiment of a process for a gravity measurement.

FIG. 7 is a flow diagram illustrating an embodiment of a process for a gravity measurement. In some embodiments, the process of FIG. 7 is implemented using the system of FIG. 1. In the example shown, in 700 three ensembles of atoms are provided. For example, atoms are dispensed to be cooled and provided to be measured using laser beams. In 702, three ensembles of atoms are cooled using two or more laser beams, where the two or more laser beams are routed in opposing directions intersecting the three ensembles of atoms with appropriate polarizations chosen for cooling using a polarizing beamsplitter and a retro-reflection prism assembly in a racetrack configuration in addition to transverse beams that are independent of the racetrack beams. In 703, three ensembles of atoms are interrogated using two or more laser beams, wherein the two or more laser beams are routed in opposing directions intersecting the ensembles of atoms with appropriate polarizations chosen for interferometer interrogation using a polarizing beamsplitter and a retro-reflection prism assembly in a racetrack configuration, wherein the three ensembles of atoms are positioned coaxially when interrogated. In 704, gravity measurement(s) is/are determined.

Figure 8A:
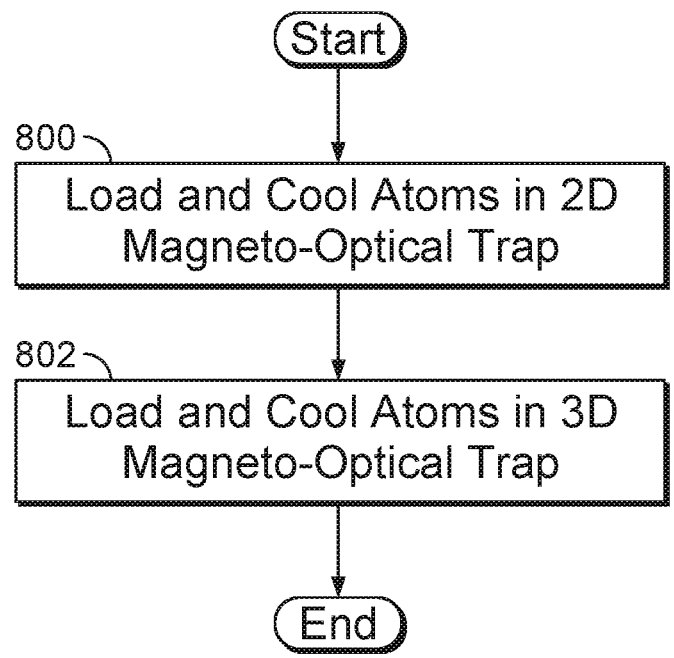
FIG. 8A is a flow diagram illustrating an embodiment of a process for providing an ensemble of atoms.

FIG. 8A is a flow diagram illustrating an embodiment of a process for providing an ensemble of atoms. In some embodiments, the process of FIG. 8A is used to implement 700 of FIG. 7. In the example shown, in 800 atoms are loaded and cooled in a 2D magneto-optical trap. For example, atoms (e.g., rubidium or cesium atoms) are dispensed and loaded into a 2D-MOT. In 802, atoms are loaded and cooled in a 3D magneto-optical trap.

Figure 8B:
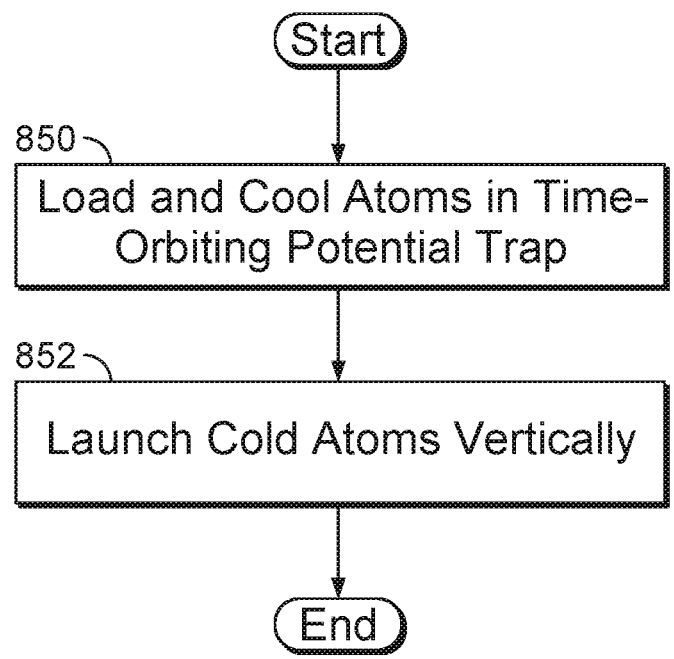
FIG. 8B is a flow diagram illustrating an embodiment of a process for cooling an ensemble of atoms below the Doppler limit.

FIG. 8B is a flow diagram illustrating an embodiment of a process for cooling an ensemble of atoms below the Doppler limit, or sub-Doppler cooling. In some embodiments, the process of FIG. 8B is used to implement 702 of FIG. 7. In the example shown, in 850 atoms are loaded and cooled in a time orbiting potential trap. In 852, cold atoms are launched vertically.

In some embodiments, atoms are launched without sub-Doppler cooling.

Figure 9:
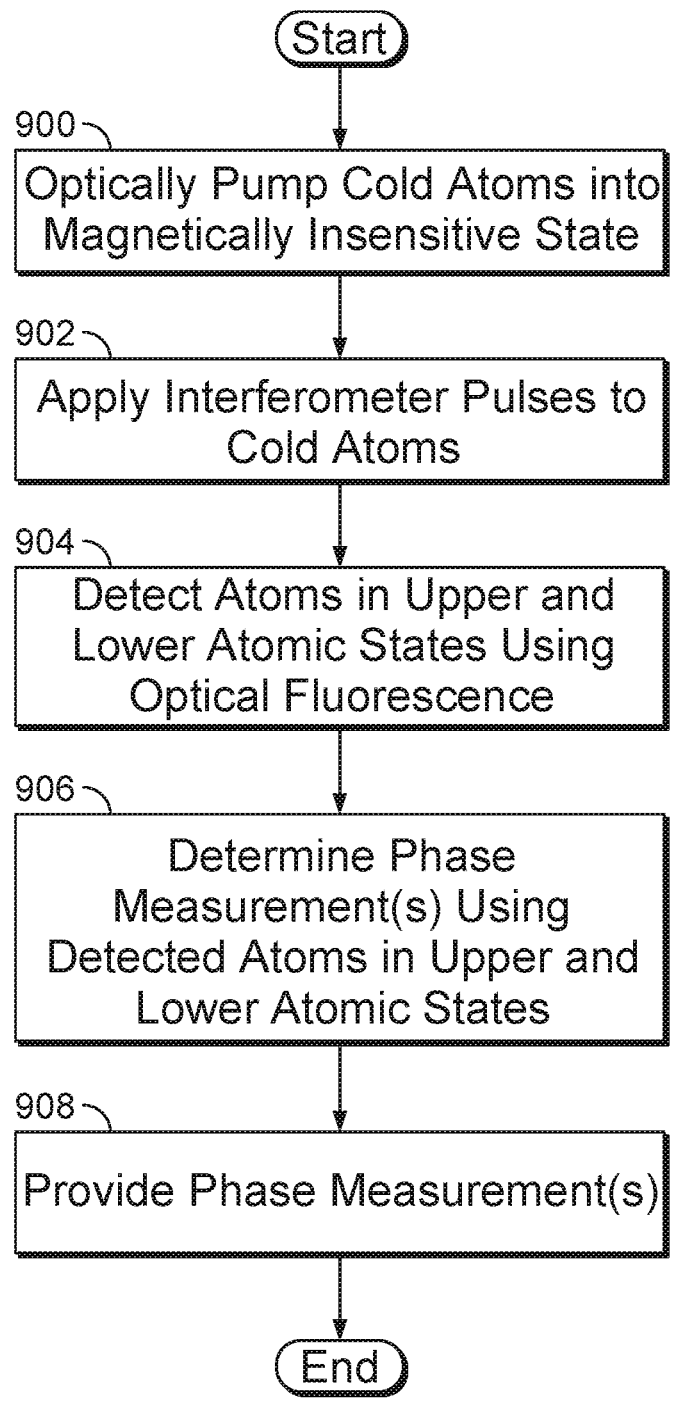
FIG. 9 is a flow diagram illustrating an embodiment of a process for interrogating an ensemble of atoms.

FIG. 9 is a flow diagram illustrating an embodiment of a process for interrogating an ensemble of atoms. In some embodiments, the process of FIG. 9 is used to implement 703 of FIG. 7. In the example shown, in 900 cold atoms are optically pumped into a magnetically insensitive state. In some embodiments, step 900 is not performed and the processor starts with step 902 selecting atoms already in a magnetically insensitive state. In 902, interferometer pulses are applied to cold atoms. In 904, atoms are detected in upper and or lower atomic states using optical fluorescence. In 906, phase measurement(s) are determined using detected atoms from 904. In 908, phase measurement(s) are provided.

Figure 10:
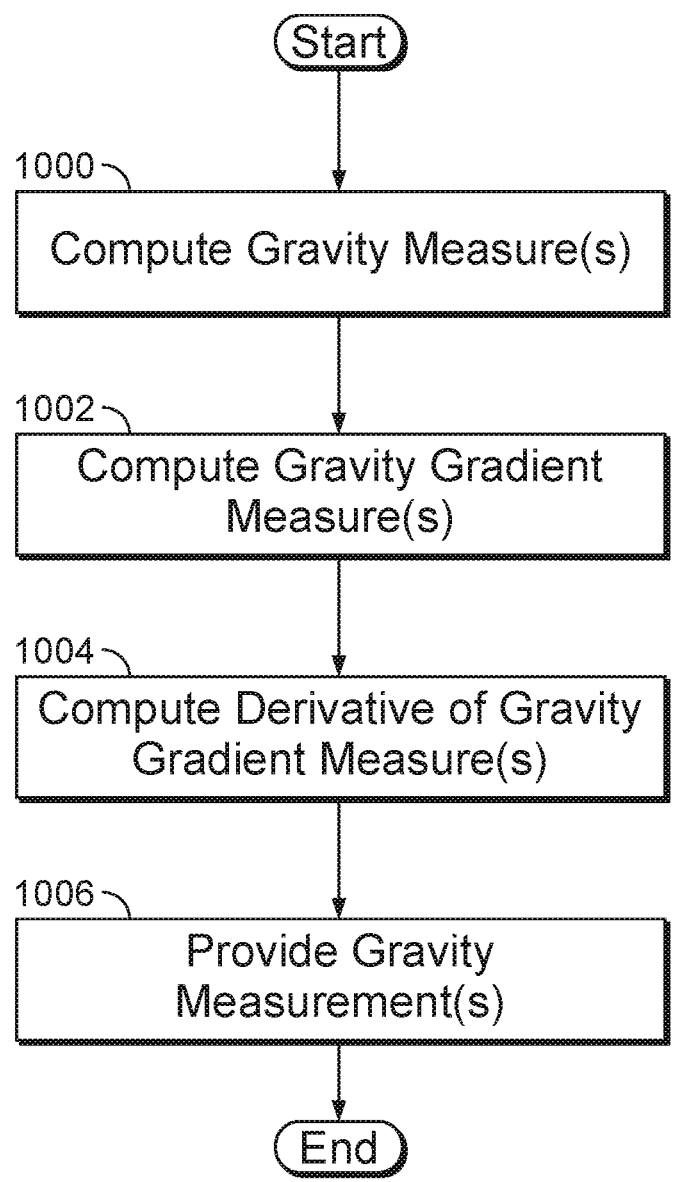
FIG. 10 is a flow diagram illustrating an embodiment of a process for determining gravity measurement(s).

FIG. 10 is a flow diagram illustrating an embodiment of a process for determining gravity measurement(s). In some embodiments, the process of FIG. 10 is used to implement 704 of FIG. 7. In the example shown, in 1000 gravity measure(s) is/are computed. In 1002, gravity gradient measure(s) is/are computed. In 1004, derivative of gravity gradient measure(s) is/are computed. In 1006, gravity measurement(s) is/are provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for gravity measurement comprising:
   one or more atom sources to provide three ensembles of atoms;
   two or more laser beams to cool or interrogate the three ensembles of atoms; and
   a polarizing beamsplitter and a retro-reflection prism assembly in a racetrack configuration, wherein the racetrack configuration routes the two or more laser beams in opposing directions around a loop topology, intersecting the three ensembles of atoms with appropriate polarizations chosen for cooling or interferometer interrogation, wherein the three ensembles of atoms are positioned coaxially within a measurement space when interrogated, wherein the two or more laser beams comprise a laser beam A routed into the measurement space at an upper end of the measurement space, and a laser beam B routed into the measurement space at a lower end of the measurement space in an opposing direction to laser beam A.

2. A system as in claim 1, wherein one or more atom sources used to produce the three ensembles of atoms are produced by one of the following sub-recoil atom cooling techniques: delta-kick cooling, Raman sideband cooling, or evaporative cooling.

3. A system as in claim 1, wherein the one or more atom sources used to produce the three ensembles of atoms comprise one or more 2D-MOTs.

4. A system as in claim 1, wherein the one or more atom sources used to produce the three ensembles of atoms comprise one or more 3D-MOTs.

5. A system as in claim 1, wherein the one or more atom sources used to produce the three ensembles of atoms use 3D optical molasses.

6. A system as in claim 1, wherein the three ensembles of atoms are allowed to fall freely from their initial positions.

7. A system as in claim 1, wherein the three ensembles of atoms are launched vertically upward from their initial positions to extend measurement time.

8. A system as in claim 7, wherein the three ensembles of atoms are launched vertically upward from their initial positions by offsetting relative frequencies of polarization gradient cooling lasers.

9. A system as in claim 7, wherein the three ensembles of atoms are launched vertically upward from their initial positions using one or more Bragg transitions.

10. A system as in claim 7, wherein the three ensembles of atoms are launched vertically upward from their initial positions by accelerating them in an optical lattice.

11. A system as in claim 1, wherein the interferometer interrogation uses 2-photon Bragg transitions.

12. A system as in claim 1, wherein the three ensembles of atoms are substantially equally spaced to balance laser path length differences between pairs of ensembles.

13. A system as in claim 1, wherein the three ensembles of atoms are separated vertically.

14. A system as in claim 1, wherein a phase of one or more interferometer laser pulses is spatially modulated to create a spatial phase variation across the three ensembles of atoms.

15. A system as in claim 1, wherein a spatially resolved phase measurement is made of the atoms exiting the interferometer.

16. A system as in claim 1, wherein the interferometer interrogation is used to produce a plurality of gravity measurements.

17. A system as in claim 16, wherein a gravity measurement of the plurality of gravity measurements comprises a gravity gradient measurement.

18. A system as in claim 16, wherein a gravity measurement of the plurality of gravity measurements comprises a derivative of a gravity gradient measurement.

19. A system as in claim 18, wherein the derivative of the gravity gradient measurement is determined using a known arbitrary spacing of the three ensembles of atoms.

20. A system as in claim 1, wherein a gravity measurement of a plurality of gravity measurements is compensated for platform motion using an auxiliary accelerometer measurement or a rotation sensor measurement.

21. A system as in claim 1, wherein the interferometer interrogation is used to measure an interferometer phase of one or more interferometers, and wherein the interferometer phase of the one or more interferometers is/are read in quadrature to compensate for phase uncertainty due to platform motion.

22. A system as in claim 1, wherein more than two photon momentum recoils are transferred to the three ensembles of atoms for enhanced sensitivity.

23. A method for gravity measurement comprising:
   providing three ensembles of atoms using one or more atom sources; and
   cooling or interrogating the three ensembles of atoms using two or more laser beams, wherein the two or more laser beams are routed in opposing directions around a loop topology intersecting the three ensembles of atoms with appropriate polarizations chosen for cooling or interferometer interrogation using a polarizing beamsplitter and a retro-reflection prism assembly in a racetrack configuration, wherein the three ensembles of atoms are positioned coaxially within a measurement space when interrogated, wherein the two or more laser beams comprise a laser beam A routed into the measurement space at an upper end of the measurement space, and a laser beam B routed into the measurement space at a lower end of the measurement space in an opposing direction to laser beam A.

24. A computer program product for a gradiometer, the computer program product being embodied in a non-transitory computer readable storage medium and comprising computer instructions for:

causing three ensembles of atoms to be provided using one or more atom sources; and causing the three ensembles of atoms to be cooled or interrogated using two or more laser beams, wherein the two or more laser beams are routed in opposing directions around a loop topology intersecting the three ensembles of atoms with appropriate polarizations chosen for cooling or interferometer interrogation using a polarizing beamsplitter and a retro-reflection prism assembly in a racetrack configuration, wherein the three ensembles of atoms are positioned coaxially within a measurement space when interrogated, wherein the two or more laser beams comprise a laser beam A routed into the measurement space at an upper end of the measurement space, and a laser beam B routed into the measurement space at a lower end of the measurement space in an opposing direction to laser beam A.

\* \* \* \* \*

UNITED STATES PATENT AND TRADEMARK OFFICE
CERTIFICATE OF CORRECTION

PATENT NO. : 10,107,937 B2
APPLICATION NO. : 14/975174
DATED : October 23, 2018
INVENTOR(S) : Mark A. Kasevich et al.

It is certified that error appears in the above-identified patent and that said Letters Patent is hereby corrected as shown below:

In the Specification

In Column 3, Line 49, delete "(it pulse)" and insert --($\pi$ pulse)--, therefor.
In Column 4, Line 5, after "and", delete "$\varphi$" and insert --$\phi$--, therefor.

Signed and Sealed this
Twenty-sixth Day of March, 2019

Andrei Iancu
*Director of the United States Patent and Trademark Office*